3,410,374
RAILWAY BRAKE SHOES AND COMPOSITIONS SUITABLE FOR USE THEREIN
Clarence Gordon Haupt, Blacksburg, Va., assignor to Walker Machine & Foundry Corporation, Roanoke, Va., a corporation of Virginia
Filed Sept. 6, 1966, Ser. No. 577,223
12 Claims. (Cl. 188—251)

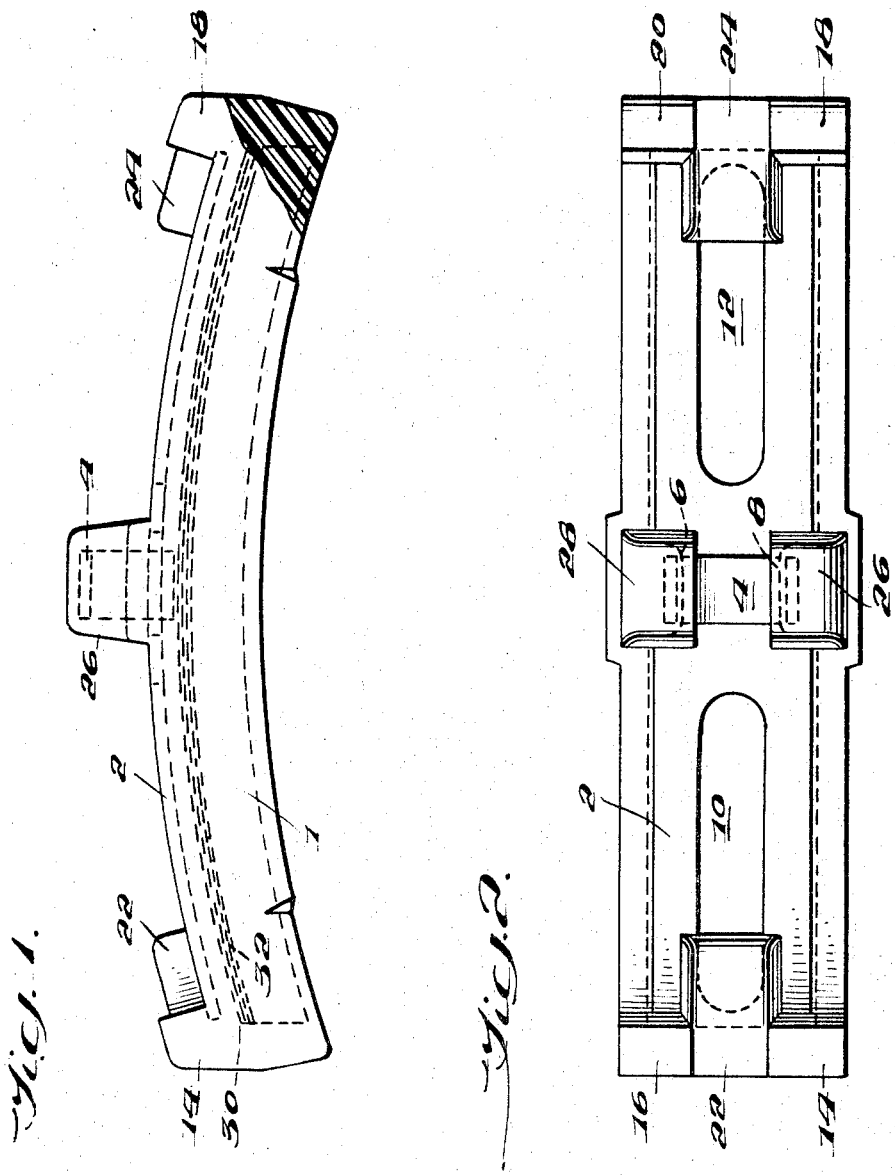

ABSTRACT OF THE DISCLOSURE

Composition railway brake shoes are provided which are capable of extended service, and which lack well known shortcomings commonly encountered in the prior art. The particular composition which is capable of being utilized in brake shoes according to the invention also finds utility in other applications which demand a controlled sliding friction engagement, and is formed from a moldable and pourable combination of components consisting essentially of specified quantities of a resinous binder containing an epoxy resin and curing agent, graphitic carbon, and an abrasive substance in a quantity capable of substantially diminishing the lubricity of the graphitic carbon.

---

The present invention relates to railway brake shoes and to compositions suitable for use in producing the same. More particularly, the present invention concerns improved composition railway brake shoes and moldable compositions capable of extended service as an integral component of the same.

Railway brake shoes have commonly been made for nearly one hundred years of cast iron molded over a steel back. The back is usually provided with an integral loop for attachment by a key of wedge to a brake head. The cast iron component serves as a low friction material and is shaped to engage and rub against the tread of the wheel when the brakes are applied. Such cast brake shoes have exhibited well known shortcomings such as (1) extreme weight, (2) relatively high incidence of breakage upon impact, (3) limited wearing qualities, (4) high noise level while braking, and (5) sparking tendency.

Efforts have been made in recent years to utilize other materials in place of cast iron as friction materials in railway brake shoes. Generally these brake shoe materials have involved compositions formed by the incorporation of hard mineral particles into natural or synthetic rubber based bonding materials. Since the composition brake shoes produced heretofore commonly have possessed high friction properties excessive wearing of the wheel tread has often resulted which has been enhanced by the inherent tendency of the rubbery material to pick up and embed extraneous abrasive particles encountered during use. The high friction properties have also tended to produce high temperatures at the shoe-tread interface thereby causing excessive heating of the wheel tread, which is sometimes accompanied by the charring, crumbling, and separation of the organic bonding materials and complete failure of the shoe. Uneven or excessive braking action often results when one attempts to substitute high friction low pressure composition brake shoes for conventional low friction high pressure cast iron brake shoes, which necessitates the need for special braking equipment for use with the same.

It is an object of the invention to provide improved composition brake shoes particularly suited for use with heavy railway rolling stock and long wearing moldable compositions suitable for use therein.

It is another object of the invention to provide a moldable composition which may be cured at ambient temperature to a tough long wearing product.

It is a further object of the invention to provide an improved long wearing railway composition brake shoe which is interchangeable with conventional cast iron brake shoes without modification of existing braking equipment.

These and other objects, as well as the nature, scope, and utilization of the invention, will be further apparent from the following detailed description.

FIG. 1 is a side elevation view of a preferred brake shoe embodiment in which a material according to the invention is substituted for the conventional cast iron component to form the main body of the shoe.

FIG. 2 is a top plan view of the brake shoe of FIG. 1.

It has now been discovered that a generally arcuate railway brake shoe capable of extended service and adapted to generally conform to the contour of a railway wheel comprises a metallic back; a brake shoe body adhering to said metallic back formed from a moldable composition of matter comprising an intimate mixture of (A) a resinous binder containing an epoxy resin and a curing agent for the epoxy resin, and (B) a filler material containing a substantial quaitity of graphitic carbon in a concentration of at least about 20 percent by weight of the total composition, and an abrasive substance in a quantity capable of substantially diminishing the lubricity exhibited by the graphitic carbon present in the composition; and means adapted to attach said brake shoe to a brake head.

As illustrated in FIGS. 1 and 2, brake shoes may be formed in the same configuration as conventional cast iron brake shoes merely by substituting in the main body of the same the tough long wearing material 1 of the invention for the cast iron component. A metallic back 2, preferably formed from rolled steel strip, supports the material 1 with its convex face being largely exposed. The brake shoe may be secured to conventional railway braking equipment by the presence of one or more metallic loops 4 which may be secured adjacent indentations 6 and 8 present in the metallic back 2. A suitable wedge or key (not shown) passes through loop 4 to secure the brake shoe to the conventional railway brake head. If desired, other suitable attaching elements may be utilized. The metallic back 2 may be provided with apertures 10 and 12 which accordingly provide an additional area for firm engagement between material 1 and metallic back 2 since the apertures 10 and 12 may be at least partially filled with material 1. At opposite ends of the brake shoe a pair of spaced end stops 14, 16, 18 and 20 are positioned, and between each pair intermediate lugs 22 and 24 may be provided. At each side of the loop 4 center mounting lugs 26 and 28 are positioned which provide additional support for loop 4. Within material 1 is preferably situated some form of reinforcement, such as strips of expanded mild steel or wire 30 and 32. The number of reinforcing strips provided may be varied from approximately one to about seven. If desired, reinforcement may also be provided in the form of various reinforcements commonly used in railway brake shoes. The tough, long-wearing material according to the invention is cast by conventional molding procedures to form the end stops 14, 16, 18 and 20, the intermediate lugs 22 and 24, and the center mounting lugs 26 and 28 in addition to the main body of the brake shoe.

The moldable compositions used as an essential component of the brake shoes are formed by first mulling the filler material into the epoxy resin to form a homogeneous mixture, followed by the addition of an epoxy resin curing agent.

A wide variety of commercially available epoxy resins may be utilized in accordance with the invention in the formation of the resinous binder. For best results it is recommended that an uncured epoxy resin be selected which is inherently liquid at about room temperature or which may be modified to possess flowable properties at about room temperature. Compositions according to the invention which include such an epoxy resin component are moldable and may be readily poured into a suitable mold prior to hardening. As discussed hereafter, various modifiers or diluents may, if desired, be employed in conjunction with the epoxy resin to render the composition less viscous at about room temperature prior to molding and subsequent hardening.

The epoxy resins utilized in the present invention are most commonly prepared by the condensation of bisphenol A (4,4' isopropylidenediphenol) and epichlorohydrin. Also, other polyols, such as aliphatic glycols and novolac resins may be reacted with epichlorohydrin for the production of epoxy resins suitable for incorporation in the instant compositions provided resinous products are selected which possess the requisite moldability properties.

In a preferred embodiment of the invention epoxy resins are selected which possess terminal epoxide groups and are condensation products of bisphenol A and epichlorohydrin of the following formula:

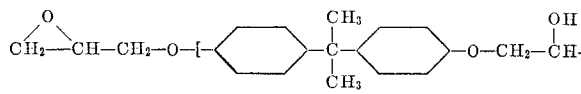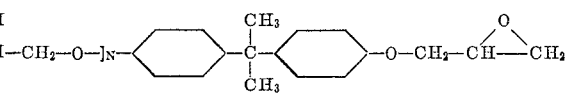

where N varies between zero and a small number less than about 10. When N is zero, the resin is a very fluid light-colored material which is essentially the diglycidyl ether of bisphenol A. As the molecular weight increases so generally does the viscosity of the resins. Accordingly, the particularly preferred liquid epoxy resins generally possess an N value averaging less than about 1.0. Illustrative examples by their standard trade designations of particularly useful commercially available epoxy resins include: "Genepoxy M180" (General Mills), "Epi-Rez 5071" (Jones-Dabney), "D.E.R. 334" (Dow Chemical), "Epon 815" (Shell Chemical), "ERL 2795" (Bakelite), "Tipox A" (Thiokol), Araldite 506" (Ciba), and "Araldite 6004" (Ciba).

In order to decrease the viscosity of the epoxy resins to readily facilitate the incorporation of relatively large quantities of finely divided graphitic carbon containing material discussed hereafter one may optionally include in compositions prior to the hardening of the same a suitable quantity of an epoxy resin modifier or diluent. Numerous modifiers or diluents of both the reactive and nonreactive types are well known. For instance, butyl glycidyl ether in a concentration of up to about 15 parts per 100 parts by weight of simple epoxy resin may be employed. Higher molecular weight alkyl glycidyl ethers or mixtures thereof having up to about 12 carbons per alkyl group are also suitable for use. A mixture of glycidyl ethers having alkyl groups which are predominantly n-octyl ($C_8$) and n-decyl ($C_{10}$) in concentrations of 10 to 40, and preferably about 20 parts per 100 by weight of the simple epoxy resin produces particularly satisfactory results. Furfural alcohol in concentrations of about 10 to 30 parts per 100 by weight of the simple epoxy resin is a further example of a satisfactory diluent or modifier capable of reducing the viscosity of the epoxy resin prior to the hardening of the composition. When epoxy resin modifiers or diluents of the reactive type are utilized, the weight of the simple epoxy resin plus the weight of the chemically combined reactive diluent or modifier is considered the weight of the epoxy resin for purposes of this invention disclosure unless otherwise indicated.

A variety of epoxy resin curing agents may be used in the present compositions as an essential component of the resinous binder to yield tough long wearing materials possessing high physical strength. The curing or hardening of the epoxy resin typically involves further reaction of the epoxy or hydroxyl groups to cause molecular chain growth and crosslinking. The term "curing agent" as used herein is accordingly defined to include the various hardeners of the co-reactant type. In general the curing of the present compositions may satisfactorily be conducted at ambient temperature, i.e. about 50° F. to about 90° F. However, if accelerated curing times are desired, more highly elevated temperatures may be utilized. Illustrative classes of known epoxy curing agents which may be utilized in the present compositions include aliphatic and aromatic amines, polyamides, tertiary amines, amine adducts, acid anhydrides, acids, aldehyde condensation products, and Lewis acid type catalysts, such as boron trifluoride.

Polyamine and polyamide curing agents are preferred since curing by the use of these agents may be readily conducted at ambient temperatures. The liquid polyamides having free amino groups form a particularly preferred class of curing agents. These agents are essentially condensation products of dimerized and trimerized vegetable oil fatty acids, such as linoleic acid, and aryl or alkyl polyamines and have free amino groups. Such curing agents possess the ability to serve as a combination hardener and flexibilizer which imparts a toughness to the product which has been found to be superior to that obtained by the use of standard aliphatic polyamine curing agents. Suitable fatty acid containing vegetable oils include peanut, cottonseed, wheat, soybean, corn, and linseed oil. Polyamines suitable for condensation therewith include ethylenediamine. See, U.S. Patents Nos. 2,450,940 to Cowan et al., and 2,705,223 to Renfrew et al. for a further discussion of these condensation products. For best results polyamide curing agents having free amino groups are selected which are either liquid at room temperature or which may be converted into a freely flowing liquid upon warming or upon admixture with a suitable solvent. Such curing agents are preferably present in weight concentration ratio of curing agent to epoxy resin from about 0.5/1 to about 1/1. One or more polyamide curing agents may be used alone or in conjunction with other epoxy curing agents. Illustrative examples by their standard trade designations of particularly useful commercially available polyamide curing agents possessing free amino groups include: "Versamid 125" (General Mills), "D.E.H. 12" (Dow Chemical), "Pentamid 825" (Ciba), "Pentamid 840" (Ciba), "Genamid 2000" (General Mills) and "Epi-Cure 872" (Jones-Dabney).

Various additional epoxy resin modifiers and flexibilizers such as thermosetting polyester resins may also be included in the resinous binder of compositions according to the invention to further modify the toughness and durability of the product. The addition of such components is optional. It has been found, for instance, that the toughness of the compositions may be further modified by the addition of a liquid unsaturated linear alkyd resin possessing a Brookfield viscosity at 25° C. of about 1,900 to 2,100 c.p.s., a specific gravity at 25° C. of about 1.16 to 1.18, and a maximum uncompounded chloride content of 0.5 percent by weight. Such a polyester may suitably be present in a concentration of about 0 to 30 parts, and preferably about 20 parts by weight per each 100 parts by weight of epoxy resin and is made available under the trade designation "Hetron 197" by the Durez Plastics Division of Hooker Chemical Company.

Graphitic carbon is an essential component of the filler material used in compositions according to the invention and is present in a concentration of at least about 20 percent by weight of the total composition. Such a relatively large proportion of graphite has been found to serve as a remarkably effective filler for the epoxy resin compositions. As discussed hereafter, the natural lubricity of the graphite is modified and substantially diminished by the further presence of a mildly abrasive substance within the composition. The resulting compositions yield a tough long wearing material which has proven to be particularly well-suited for sliding friction applications such as encountered in a railway brake shoe environment. For best results it is recommended that the concentration of the graphitic carbon not exceed about 40 percent by weight of the total composition. The incorporation of greater quantities of this substance into the epoxy resin binder is found to be increasingly time consuming and the moldability and the service properties of the resulting composition are decreased. In a preferred embodiment of the invention graphitic carbon is present in a concentration of about 30 to about 35 percent by weight based upon the total composition. As with each solid component added to the epoxy resin binder, it is essential that the graphitic carbon be finely divided so that an intimate mixture of the various components results. The presence of the graphitic carbon component within the composition has also been found to significantly shorten the gel and cure times of the epoxy resin.

The second component of the filler material which is incorporated within the resinous binder is any of a wide variety of abrasive substances which are capable of substantially diminishing and offsetting the inherent lubricity properties of graphitic carbon when in intimate contact therewith. Such abrasive substances therefore act in conjunction with the graphitic carbon to provide an appropriate balance of lubricity-abrasive properties. Compositions according to the invention accordingly exhibit controlled abrasive properties particularly suited for friction applications. The specific quantity of abrasive substance present is adjusted to provide the degree of relatively mild abrasiveness desired for the particular application to which it is intended. In compositions intended for use in railway brake shoe applications the quantity of mild abrasive present may suitably range from about 15 to about 25 percent by weight based upon the total composition. Railway brake shoes utilizing the subject material commonly exhibit a coefficient of friction generally comparable to that of cast iron but lack the heretofore recognized shortcomings of the same. In a particularly preferred embodiment of the invention the mild abrasive is present in a concentration of about 20 percent by weight based upon the total composition. The abrasives may be selected from a wide variety of finely divided materials. For instance, natural or manufactured abrasives such as pumice, tripoli, feldspar limestone, granite, calcite, dolomite, or aluminum oxide may be utilized. The particularly preferred mild abrasives include the various clay minerals which predominantly comprise hydrous silicates of aluminum, iron or magnesium with or without other rock and mineral particles. Illustrative examples of suitable clays include kaolinite, montmorillonite, vermiculite, attapulgite, bentonite, fuller's earth and ball clays.

In a particularly preferred embodiment a graphitic carbon containing material is selected for inclusion in the resinous binder which provides in a single material both the (1) graphitic carbon component and (2) the abrasive component in the desired proportions. Suitable graphitic carbon containing materials may be selected from naturally occurring graphite deposits such as graphite containing metamorphosed carbonaceous clays and shales. These materials containing the various clay minerals may be added to the epoxy resin binder in finely divided form, and are available commercially under various designations which include "natural graphite" or "natural medium class plumbago." Such materials are preferably present in a concentration of approximately 50 percent by weight based upon total composition. Particularly preferred materials have a graphitic carbon content of about 55 to 65 percent by weight. If desired, blends of various naturally occurring graphitic carbon materials may be utilized which contain "slip" stabilizers commonly utilized in graphitic carbon applications.

The following example is given as a specific illustration of the present invention.

EXAMPLE

A plastic mold was formed using a wooden pattern having a configuration of the brake shoe shown in FIGS. 1 and 2. A steel loop provided with a sand core to prevent closure of the loop, an arcuate metallic back formed from rolled steel strip, and a bundle of expanded steel reinforcements were next affixed in their proper positions within the mold. A release agent was used to treat the internal surfaces of the mold to prevent the composition from adhering thereto.

One hundred parts by weight of liquid epoxy resin including a reactive diluent were weighed. The simple epoxy resin was essentially the diglycidyl ether of bisphenol A where N equalled approximately zero in the formula set forth heretofore. Butyl glycidyl ether served as the reactive diluent and was present in a concentration of 12 percent by weight of the epoxy resin. The liquid epoxy resin was marketed under the trade designation "Genepoxy M180" by General Mills, Inc. and possessed a Brookfield viscosity at 25° C. of 500 to 900 c.p.s., an epoxide equivalent of 178 to 195, a specific gravity at 25° C. of 1.12 to 1.14, a Cleveland open cup flash point minimum of 70° C., a maximum pour point of 5° F., and a maximum chloride content of 0.35 weight percent.

One hundred and sixty-eight parts by weight natural medium class plumbago (graphite) marketed under the trade designation of "Plumbago 136" by the Hill-Griffith Co. were weighed. Graphitic carbon was present in the natural graphite in a concentration of approximately 60 percent by weight. The remaining 40 percent of the natural graphite was composed largely of clay minerals which predominantly comprised a mixture of various hydrous silicates. The maximum content of the natural graphite volatile at 105° C. was 5 percent by weight. The material was ground to a finely divided particle size all of which would pass through a 60 mesh standard screen, a minimum of 95 percent of which would pass through a 100 mesh standard screen, and a minimum of 65 percent by weight of which would pass through a 325 mesh standard screen.

At room temperature (75° F.) the finely divided natural graphite was added to the liquid epoxy resin in increments of 5 to 10 parts per hundred of the epoxy resin by weight with a mulling action for 2 to 3 minutes following each addition until a smooth, homogeneous paste was formed.

Twenty parts by weight of a liquid polyamide curing agent having free amino groups and marketed under the trade designation of "Versamid 125" by General Mills, Inc. were weighed, and were slowly added to the epoxy resin-natural graphite mixture with constant mulling to produce a smooth semi-paste. This curing agent possessed a Brookfield viscosity at 75° C. of 900 cps. maximum, an amine value of 330 to 400, a maximum pour point of 0° C., and a Cleveland open cup flash point minimum of 180° C. The maximum content of material volatile at 105° C. was 1.0 percent by weight.

Forty-eight parts by weight of a liquid amido-amine curing agent having free amino groups and marketed under the trade designation "Genamid 2000" by General Mills, Inc. were previously weighed and immediately added to the above-mixture with constant stirring. This second curing agent possessed a maximum Brookfield viscosity at 25° C. of 2,500 cps., an amine value of 575 to 620, and a Cleveland open cup flash point minimum of 140° C. The entire mass was mulled for 3 to 5 minutes to produce a smooth material which was found to have a Brookfield viscosity of about 400,000 cps., and a pot life of approximately 30 minutes at ambient temperature.

The composition was next poured into the plastic mold as quickly as possible, e.g. within 2 to 3 minutes after completion of the mulling described above, and the mold was vibrated to aid in the complete filling of the same. Within 30 to 45 minutes after pouring the composition had gelled. After the passage of another 45 to 60 minutes the composition was sufficiently cured to allow removal from the mold. No external heating was applied at any stage of the process.

Brake shoes according to the invention have been tested extensively with railway rolling stock under a variety of conditions. For instance, tests have been conducted in which the ambient temperature varied from 18° F. to 105° F. The brake shoes of the invention consistently showed less wear to both the wheel tread and the braking surface of the shoe than did conventional cast iron brake shoes which were similarly tested. The brake shoes of the invention did not heat up as readily as did the cast iron shoes and reached lower operating temperatures. The maximum temperature induced in the wheel treads showed little variation when using either cast iron brake shoes or brake shoes of the invention including the results of several tests in which brake shoes according to the invention had a slightly higher retarding force per unit area than cast iron brake shoes. In those instances where a higher coefficient of friction was exhibited with concomitant faster stopping there was, however, no evidence of excessive grabbing or locking of the wheel tread, which could cause damage to the wheel or track.

The brake shoes of the invention require the use of no special braking equipment and may be readily substituted for conventional cast iron brake shoes. Since the brake shoe body is formed from a material which is lighter in weight than cast iron, the brake shoes may be conveniently handled by workers installing the same. The moldable composition used to form the body of the brake shoes has been found to exhibit excellent adhesion to the metallic components of the shoe and is resilient enough to withstand impact without breakage. Also, it is not essential that the metallic components be cleaned, derusted, or degreased prior to being subjected to the moldable composition. The body of the brake shoe is impervious to oils, greases, water, and most chemicals, and does not tend to pick up and embed coarse extraneous abrasive particles encountered during use.

The tough, long wearing materials of the invention may also be utilized in automobile clutch facings, stairway treads or in certain other applications which demand a controlled sliding friction engagement of the character exhibited.

I claim:

1. A generally arcuate railway brake shoe capable of extended service and adapted to generally conform to the contour of a railway wheel comprising a metallic back; a brake shoe body adhering to said metallic back formed by the curing of a moldable and pourable composition of matter consisting essentially of an intimate mixture of (A) a resinous binder in a concentration of about 35 to 65 percent by weight of the total composition containing an epoxy resin and a curing agent for said epoxy resin, and (B) a filler material containing a substantial quantity of graphitic carbon in a concentration of at least about 20 percent by weight of the total composition, and an abrasive substance in a quantity capable of substantially diminishing the lubricity exhiibted by said graphitic carbon present in the composition; and means adapted to attach said brake shoe to a brake head.

2. A railway brake shoe according to claim 1 in which said brake shoe body is reinforced by expanded metal embedded in the same.

3. A railway brake shoe according to claim 1 in which the means adapted to attach said brake shoe to a brake head is a metallic loop secured to said metallic back.

4. A railway brake shoe according to claim 1 in which the filler material of said moldable composition comprises graphitic carbon in a concentration of about 20 to about 40 percent by weight of the total composition and an abrasive substance in a concentration of about 15 to about 25 percent by weight of the total composition.

5. A railway brake shoe according to claim 4 in which the filler material is finely divided natural graphite containing a clay mineral.

6. A generally arcuate railway brake shoe capable of extended service and adapted to generally conform to the contour of a railway wheel comprising a metallic back; a brake shoe body adhering to said metallic back formed by the curing of a moldable and pourable composition of matter consisting essentially of an intimate mixture of (A) a resinous binder in a concentration of approximately 50 percent by weight of the total composition containing an epoxy resin of the formula:

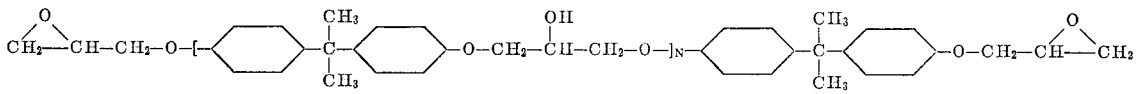

where N averages less than about 1.0, and a polyamide curing agent for said epoxy resin having free amino groups with said curing agent being present in a weight concentration ratio of curing agent to epoxy resin of about 0.5/1 to about 1/1, and (B) a finely divided filler material in a concentration of approximately 50 percent by weight based upon the weight of the total composition all of which will pass through a 60 mesh standard screen, a minimum of 95 percent of which will pass through a 100 mesh standard screen, and a minimum of 65 percent of which will pass through a 325 mesh standard screen, comprising natural graphite containing a clay mineral with graphitic carbon being present in said filler material in a concentration of about 55 to about 65 percent by weight; and means adapted to attach said brake shoe to a brake head.

7. A railway brake shoe according to claim 6 in which said brake shoe body is reinforced by expanded metal embedded in the same.

8. A railway brake shoe according to claim 6 in which the means adapted to attach said brake shoe to a brake head is a metallic loop secured to said metallic back.

9. A tough long wearing material suitable for use in railway brake shoes formed by the curing of a moldable and pourable composition of matter consisting essentially of an intimate mixture of (A) a resinous binder in a concentration of about 35 to 65 percent by weight of the total composition containing an epoxy resin and a curing agent for said epoxy resin, and (B) a filler material containing a substantial quantity of graphitic carbon in a concentration of at least about 20 percent by weight of the total composition, and an abrasive substance in a quantity capable of substantially diminishing the lubricity exhibited by said graphitic carbon present in the composition.

10. A material suitable for use in railway brake shoes according to claim 9 in which the curing agent present in said resinous binder is a polyamide curing agent having free amino groups which is present in a weight ratio of curing agent to epoxy resin from about 0.5/1 to about 1/1.

11. A material suitable for use in railway brake shoes according to claim 9 in which the filler material comprises graphitic carbon in a concentration of about 20 to about 40 percent by weight of the total composition and an abrasive substance in a concentration of about 15 to about 25 percent by weight of the total composition.

12. A tough long wearing material suitable for use in railway brake shoes formed by the curing of a moldable and pourable composition of matter comprising an intimate mixture of (A) a resinous binder in a concentration of approximately 50 percent by weight of the total composition containing an epoxy resin of the formula:

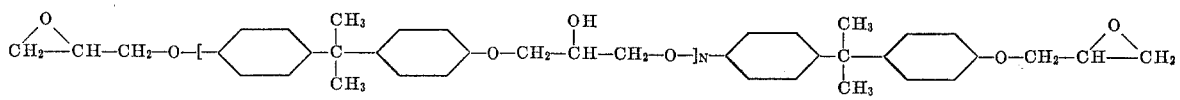

where N averages less than about 1.0, and a polyamide curing agent for said epoxy resin having free amino groups with said curing agent being present in a weight concentration ratio of curing agent to epoxy resin of about 0.5/1 to about 1/1, and (B) a finely divided filler material in a concentration of approximately 50 percent by weight based upon the weight of the total composition all of which will pass through a 60 mesh standard screen, a minimum of 95 percent of which will pass through a 100 mesh standard screen, and a minimum of 65 percent of which will pass through a 325 mesh standard screen, comprising natural graphite containing a clay mineral with graphitic carbon being present in said filler material in a concentration of about 55 to about 65 percent by weight.

References Cited
UNITED STATES PATENTS

| | | |
|---|---|---|
| 2,911,074 | 11/1959 | Fraula et al. |
| 2,971,615 | 2/1961 | Ryznar. |
| 3,210,303 | 10/1965 | Biggs. |
| 3,269,976 | 8/1966 | Ueda. |
| 3,321,287 | 5/1967 | Hunsberger _____ 51—298 XR |

MILTON BUCHLER, *Primary Examiner.*

GEORGE E. A. HALVOSA, *Assistant Examiner.*